US006222179B1

(12) United States Patent
Mikan

(10) Patent No.: US 6,222,179 B1
(45) Date of Patent: Apr. 24, 2001

(54) FIBER OPTIC CONTROL HAVING JOYSTICK

(76) Inventor: Peter J. Mikan, 31 Greenfield Rd., Milford, CT (US) 06460

( * ) Notice: Subject to any disclaimer, the term of this patent is extended or adjusted under 35 U.S.C. 154(b) by 0 days.

(21) Appl. No.: 09/329,403

(22) Filed: Jun. 10, 1999

(51) Int. Cl.[7] ................................ G06M 7/00; G01J 1/36
(52) U.S. Cl. ............... 250/221; 250/227.22; 250/227.14; 250/227.24
(58) Field of Search ............................... 250/221, 227.22, 250/227.14, 227.24

(56) References Cited

U.S. PATENT DOCUMENTS 4,445,541 * 5/1984 Schmiel ............................... 250/221
4,459,022 * 7/1984 Morey ................................. 250/221
4,731,530 * 3/1988 Mikan ................................. 250/229
5,409,074 * 4/1995 Wilson et al. ........................ 180/6.5

* cited by examiner

*Primary Examiner*—Frank G. Font
*Assistant Examiner*—Roy M. Punnoose
(74) *Attorney, Agent, or Firm*—Our Pal® Asija; H. G. Lehmann

(57) ABSTRACT

A fiber optic control device comprises a joystick having fixed thereon a pivot ball to enable the stick to have universal pivotal movement. The control has a base provided with a socket in which said pivot ball is held captive while permitting the joystick to have said universal movement. The invention provides a pair of swivel members, and pivotally mountings for said swivel members on the base for movement about non-coincidental axes. Slide driving connections are provided between said joystick and swivel members, for causing reversible movements of the members in response to universal movements of the joystick. Mirrors are carried by the swivel members, and a fiber optic light transmission device is provided, which is cooperable with said mirrors and which includes a source of light that is adapted to direct a light beam against the mirrors, thereby to provide output light signals which are a function of the virtual position of said joy stick at any time.

15 Claims, 2 Drawing Sheets

FIBER OPTIC CONTROL HAVING JOYSTICK

CROSS REFERENCES TO RELATED APPLICATIONS

1. My copending U.S. application Ser. No. 09/251,780 filed Feb. 17, 1999 and entitled FIBER OPTIC CONTROL WITH JOY STICK, and having the same ownership and same inventorship as the present application.

2. My U.S. application Ser. No. 09/309,437 filed May 11, 1999, entitled FIBER OPTIC CONTROL WITH POSITIVE MECHANICAL DRIVE FROM JOY STICK, and having the same ownership and same inventorship as the present application, now U.S. Pat. No. 6,130,424.

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are giver under any Federal program.

BACKGROUND OF THE INVENTION

1. Field of the Invention

This invention relates generally to joystick devices of the kind having a swivel mounted manually-engageable lever capable of movement from a center position to any one of a number of angular positions lying within a theoretical upwardly-extending conical surface, for controlling the operation of various types of electronic or electromechanical equipment.

2. Description of the Related Art Including Information Disclosed Under 37 CFR Sections 1.97–1.99

The following references are hereby cited as being representative of some of the known prior art in the field to which the present invention pertains:

U.S. Pat. Nos.

4,459,022 4,731,530

U.S. Pat. No. 4,459,022 discloses a fiber optic sensor wherein a mirror is directly carried by a joystick so as to have universal movement as the joystick is manipulated. An optical cable having five fibers is mounted to cooperate with the mirror One cable directs a light beam against the mirror on the joystick to be reflected thereby, and the remaining four cables pick up light that is reflected from the mirror and carry the light to a light responsive control, from which signal functions are obtained to operate various pieces of equipment.

In U.S. Pat. No. 4,731,530 a joystick operates sector members which have a predetermined varied transparency. Light beams are directed against the sectors and pass through the same with varying degrees of intensity, in the manner of a filter. These filtered beams are then utilized by means of electronic circuitry to effect control functions for operating different pieces of equipment.

While the foregoing patents disclose fiber optic cables in connection with joystick controls, the junctures where the cable were connected were shown as mostly diagrammatic in nature, with specific details largely omitted, and in practice such showings left much to be desired.

Such shortcomings in the prior art where the primary actuator is to join with the fiber optic cables are obviated by the present invention, and one object of the invention is to provide an improved and simplified, especially effective juncture means between cable ends on the one hand and the primary actuator on the other hand, which is reliable at all times.

Another object of the invention is to provide an improved fiber optic control device of the type having cables and a joystick, which is especially straightforward and simple in its construction and economical to fabricate.

A further object of the invention is to provide an improved fiber optic/joystick control as above set forth, wherein the number of moving parts are of simple shape and construction, thereby reducing manufacturing cost, simplifying assembly, and improving reliability.

Other features and advantages will hereinafter appear.

In accomplishing the above objects the invention provides a joystick control comprising, in combination a joystick having fixed thereon a pivot ball which enables the stick to have a universal pivotal movement. A base provides a socket for the pivot ball and also a pivotal mounting means for a pair of swivel members which can move about non-coincidental axes. The swivel members have slots through which the lower end portion of the joystick can pass and freely slide, thereby to establish a related relationship between the members on the one hand and the movements of the joystick on the other hand. Each swivel member carries a mirror, and there is a fiber optic light transmission means which is cooperable with the mirrors and which includes light sources, that is operable to provide output light signals which then are a function of the virtual position of the joystick at any time.

BRIEF DESCRIPTION OF THE DRAWINGS

In the accompanying drawings showing several embodiments of the invention.

DETAILED DESCRIPTION OF THE INVENTION

Figure 1:
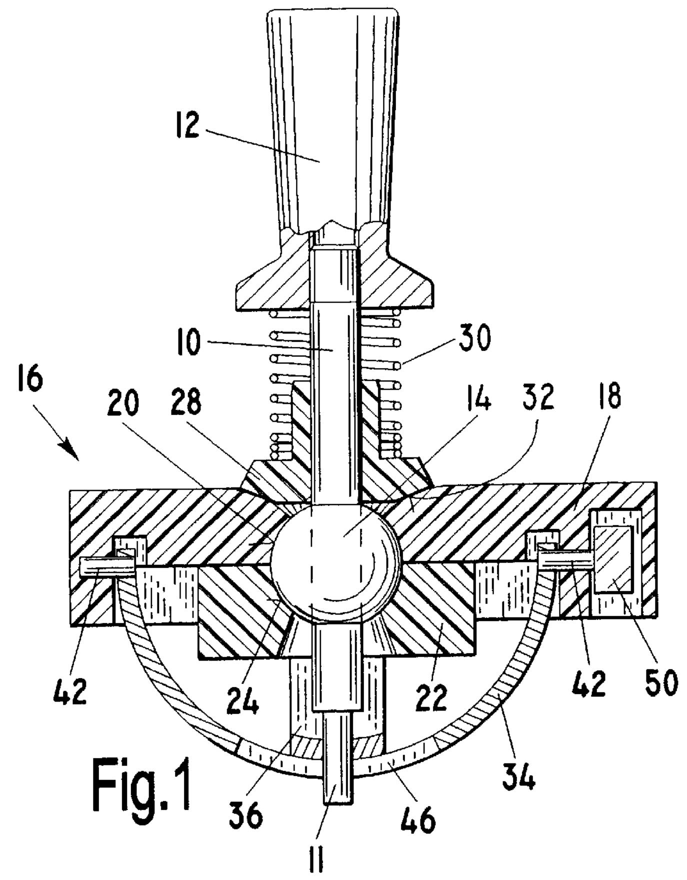
FIG. 1 is an axial sectional view of the improved joy stick controller taken on the line 1—1 of FIG. 2.
Figure 4:
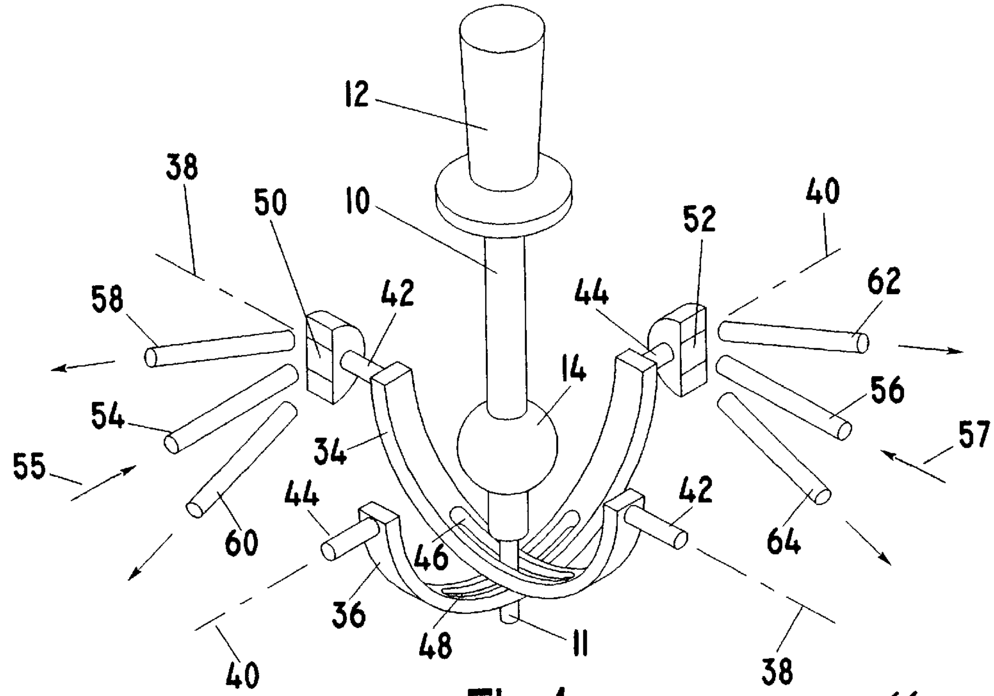
FIG. 4 is a diagrammatic perspective view of the salient working parts of the controller looking in the direction of the arrow "X" in FIG. 3.

Referring first to FIGS. 1 and 4, the improved controller of the invention comprises a joystick 10 having a lower portion 11 and an operating knob 12, and having affixed to it intermediate its ends a pivot ball 14 which when suitably mounted permits the joystick to have universal movement about the center of the ball.

Figure 2:
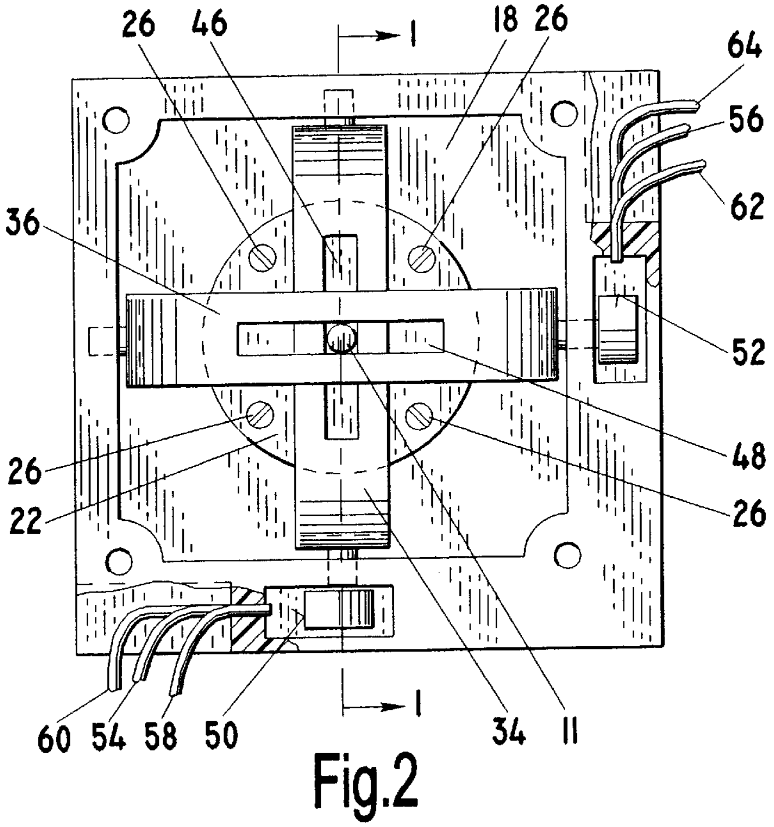
FIG. 2 is a bottom plan view of the controller of FIG. 1, with the bottom cover plate removed.

Support of the joystick 10 is effected by a base structure 16 comprising an upper member 18 which has a downwardly facing hemispherical socket formation 20 which receives the upper half portion of the ball 14, and comprising a lower base member 22 with a complementary socket formation 24 which receives the lower half of the pivot ball 14. The base members 18 and 22 can be screwed together as seen in FIG. 2, by screws 26.

On the stick 10 there is slidably carried a centralizing bushing 28 which is urged downwardly by a compression spring 30 into a concavity 32 in the upper surface of the base member 18, thereby to normally yieldably hold the joystick 10 in the upright position shown in FIG. 1.

In accordance with this invention, the universal movements of the joystick 10 are utilized in a unique manner in conjunction with mirrors and light sources, together with fiber optic light transmission means, to provide output light signals which are a function of the virtual position of the joystick 10 at any time. In accomplishing this, and referring to FIG. 4 particularly, the invention provides a pair of arcuate swivel members 34 and 36 which in this case are of are semi-circular configuration and which are pivotally mounted on the base 16 for movement about non-coincidental axes 38 and 40, such axes in this case also being respectively disposed at right angles to each other and preferably passing through the pivot ball 14.

The members 34 and 36 have pivot pins 42 and 44 respectively to effect their mounting on the base structure 16 as shown, and have arcuate slots 46 and 48 through which the lower portion 11 of the joystick 10 slidably passes.

As provided by the invention, a mirror 50 is mounted on one of the pivots 42 to turn therewith, and a second mirror 52 is mounted on one of the pivots 44 to turn therewith. As may now be readily understood from a viewing of FIG. 4, any universal movement or tilting of the joystick 10 other than along one of the axes 38, 40 will result in either one or else both of the swivel members 34, 36 being tilted or swivelled about their respective axes 38, 40. This will result in either one or else both of the mirrors 50, 52 being tilted, and the tilting of the mirrors will be a function of the universal, integrated movement of the joystick.

Use is made of this motion transmission combination to convert the movements thereof into useful output optical signals which faithfully reflect the angular or tilted positions of the joystick. In conjunction with the mirror 50 a light source indicated by the arrow 55 (FIG. 4) is provided, which sends a beam of light along a fiber optic cable 54 so as to strike the mirror and be variously reflected thereby depending on the angularity of the mirror. Likewise, a second source of light indicated by the arrow 57 is provided to send a second beam of light along a second fiber optic cable 56 to strike the mirror 52 and be variously reflected thereby according to the tilted position of this second mirror 52. The reflected light beams from the mirror 50 can strike, more or less, fiber optic signal cables 58 and 60 which are strategically located with respect thereto to provide light pulses or signals which can then be usefully employed to control output equipment in a well known manner through electronic circuitry and components. At the same time, the light beam supplied to the cable 56 for the mirror 52 can be reflected according to the tilt of the mirror 52, to effect a like control through light pulses or signals picked up by the fiber optic cables 62 and 64.

Due to the mechanical connection effected by the lower portion 11 of the joystick 10 in slidably passing simultaneously through the slots 46 and 48 in the swivel members, a relationship exists between the signals which are picked up by the fiber optic cables 58, 60 and the joystick, and also between the signals that are picked up by the cables 62, 64 and the joystick.

Figure 3:
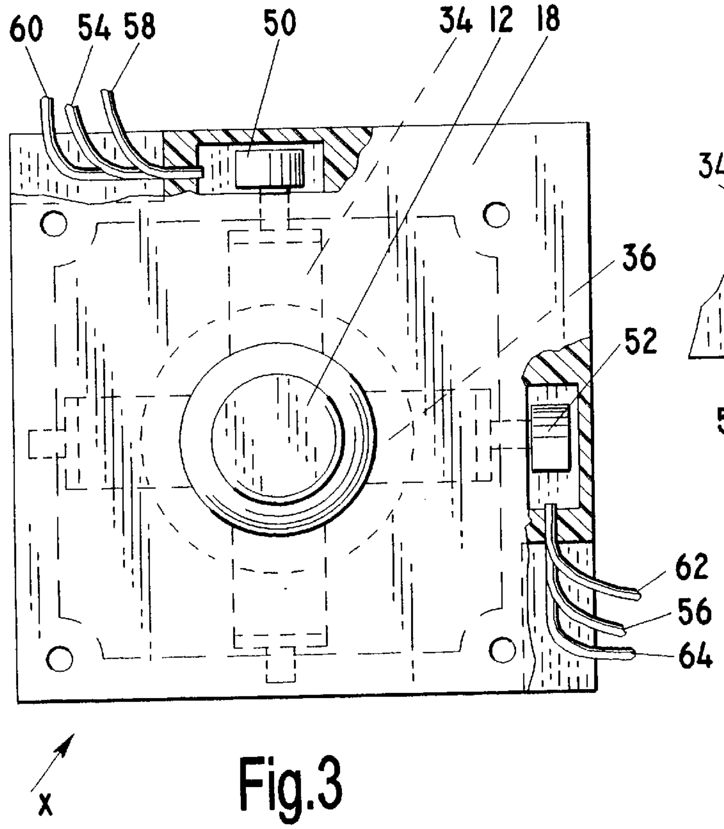
FIG. 3 is a top plan view of the controller, with portions removed revealing fragmentary horizontal sectional views.

The entry of the various fiber optic cables into the base 16 are clearly shown, in the various relevant views of FIGS. 1–3. In these views it will be seen that one set of the cables exits at one side of the base 16, whereas the other set of cables exits at another side of the base.

Figure 5:
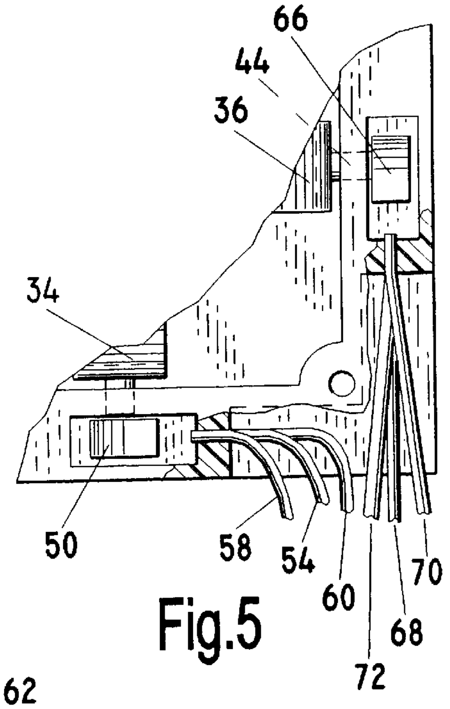
FIG. 5 is a fragmentary horizontal sectional view of a lower portion of the controller, illustrating another embodiment of the invention.

Another embodiment of the invention is illustrated in FIG. 5, which shows both sets of the fiber optic cables exiting at the same side of the base 16, making for a slightly more compact arrangement of the control. In this embodiment, components which have been previously described have been given like reference numerals. However, in the embodiment of FIG. 5, the swivel member 36 carries a mirror 66 on the other of its pivot pins 44 instead of the arrangement shown in FIG. 4. Cooperating with the mirror 66 is a light supply fiber optic cable 68, and reflected signal receiving fiber optic cables 70 and 72 receive the reflected light from the mirror 66. All of the six fiber optic cables as shown exit from the base 16 at one side edge thereof, according to this embodiment of the invention.

The present fiber optic control is small and compact, requiring little space, and is readily adaptable to use in crowded environments, as can now be understood.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

LISTING OF THE NUMERALS

10. Joystick
11. Lower portion of Joystick
12. Joystick knob
14. Pivot ball on joystick
16. Base
18. Upper member of base
20. Hemispherical socket formation
22. Lower base member
24. Complementary socket formation
26. Screws
28. Centralizing bushing
30. Compression spring
32. Concavity
34. Swivel member
36. Swivel member
38. Axis of swivel member
40. Axis of swivel member
42. Pivot of swivel member
44. Pivot of swivel member
46. Arcuate slot
48. Arcuate slot
50. Mirror
52. Mirror
54. Fiber optic cable
55. Light source
56. Fiber optic cable
57. Light source
58. Fiber optic signal cable
60. Fiber optic signal cable
62. Fiber optic signal cable
64. Fiber optic signal cable
66. Mirror
68. Fiber optic cable
70. Fiber optic signal cable
72. Fiber optic signal cable

What is claimed is:

1. A fiber optic control device comprising, in combination:

a) a joystick having fixed thereon a pivot ball to enable the stick to have universal pivotal movement, b) a base having a socket in which said pivot ball is held captive while permitting said joystick to have said universal movement, c) a pair of swivel members, d) means pivotally mounting said swivel members on the base for movement about non-coincidental axes, e) slide driving connections between said joystick and swivel members, for causing reversible movements of the members in response to universal movements of the joystick, f) mirrors carried by said swivel members, and g) fiber optic light transmission means cooperable with said mirrors and including a source of light adapted to direct a light beam against the mirrors, thereby to provide output light signals which are a function of the virtual position of said joy stick at any time.

2. A fiber optic control device as set forth in claim 1, wherein the swivel members are arcuate and have axes which pass through the said pivot ball.

3. A fiber optic control device as set forth in claim 1, wherein the mirrors are carried by the swivel members adjacent the pivots thereof.

4. A fiber optic control device as set forth in claim 1, wherein:

a) the swivel members have pivot pins.

b) said mirrors being carried by the pivot pins.

5. A fiber optic control device as set forth in claim 1, wherein:

a) the swivel members have arcuate slots, b) said slots being disposed in crossed relation with each other.

6. A fiber optic control device as set forth in claim 5, wherein the bottom of the joystick extends through the slots of the swivel members at the point where said slots cross.

7. A fiber optic control device as set forth in claim 1, wherein the mirrors are flat mirrors.

8. A fiber optic control device as set forth in claim 1, wherein the axes of the mirrors are non-coincidental.

9. A fiber optic control device as set forth in claim 1, wherein:

a) the base is of rectangular configuration, b) said light transmission means including cables that exit at adjoining sides of the base.

10. A fiber optic control device as set forth in claim 1, wherein:

a) the base is of rectangular configuration, b) b) said light transmission means including cables that exit at the same side of the base.

11. A fiber optic control device as set forth in claim 1, wherein the swivel members have pivots which are disposed in the same plane.

12. A fiber optic control device as set forth in claim 2 wherein the swivel members have a common center.

13. A fiber optic control device as set forth in claim 12, wherein the swivel members have slots which cross each other at right angles.

14. A fiber optic control device as set forth in claim 7, wherein:

a) the swivel members have pivot pins, and b) the mirrors are disposed on the pivot pins of the swivel members.

15. A fiber optic control device as set forth in claim 1, wherein a) the light transmission means includes fiber optic cables b) said cables comprising sets having terminals which are disposed in parallelism.

* * * * *